Feb. 24, 1925.
H. S. FARQUHAR
1,527,678
VALVE MECHANISM
Filed Oct. 17, 1922   5 Sheets-Sheet 1
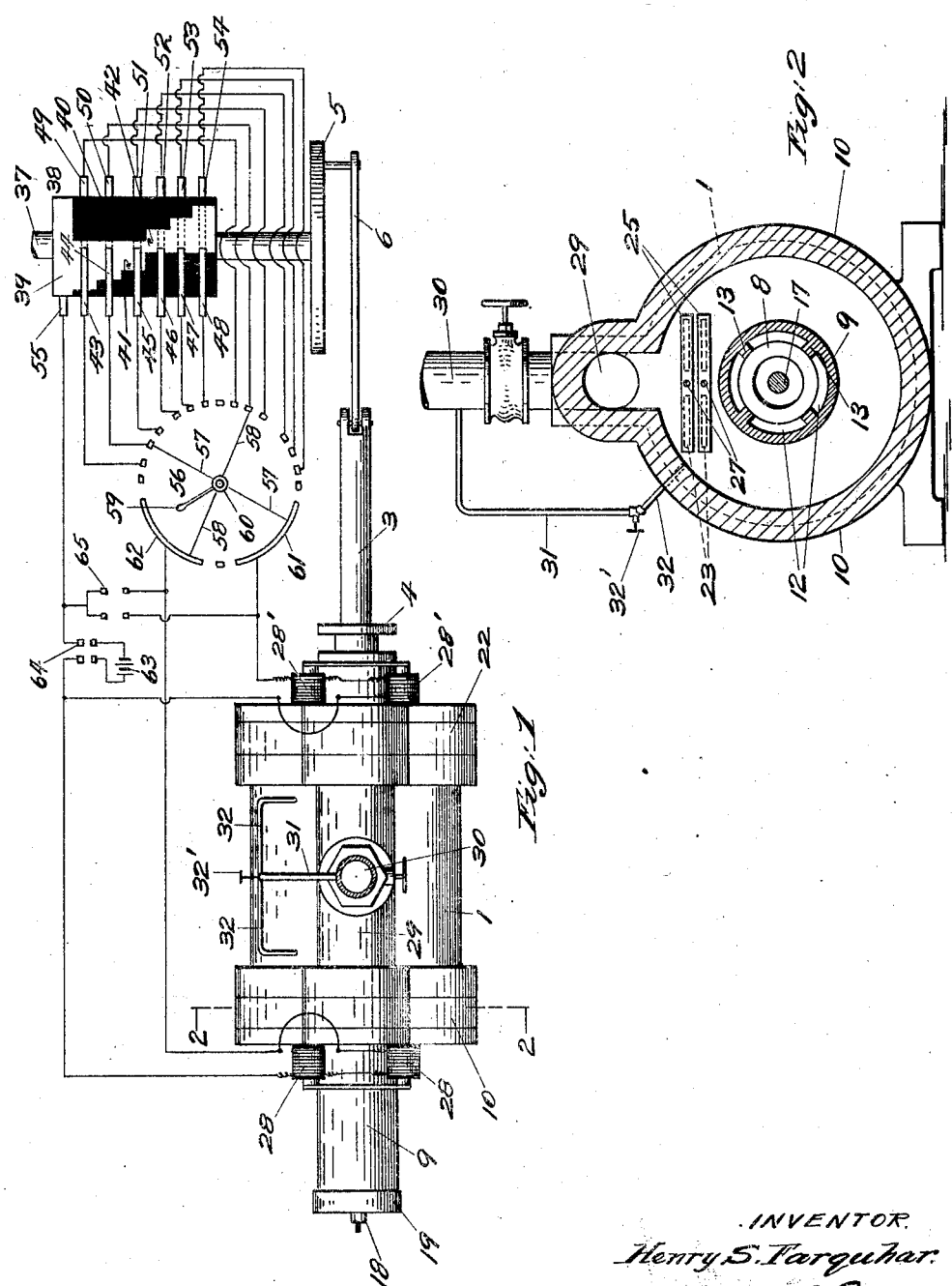
INVENTOR.
Henry S. Farquhar.
BY William J. Jackson
ATTORNEY.

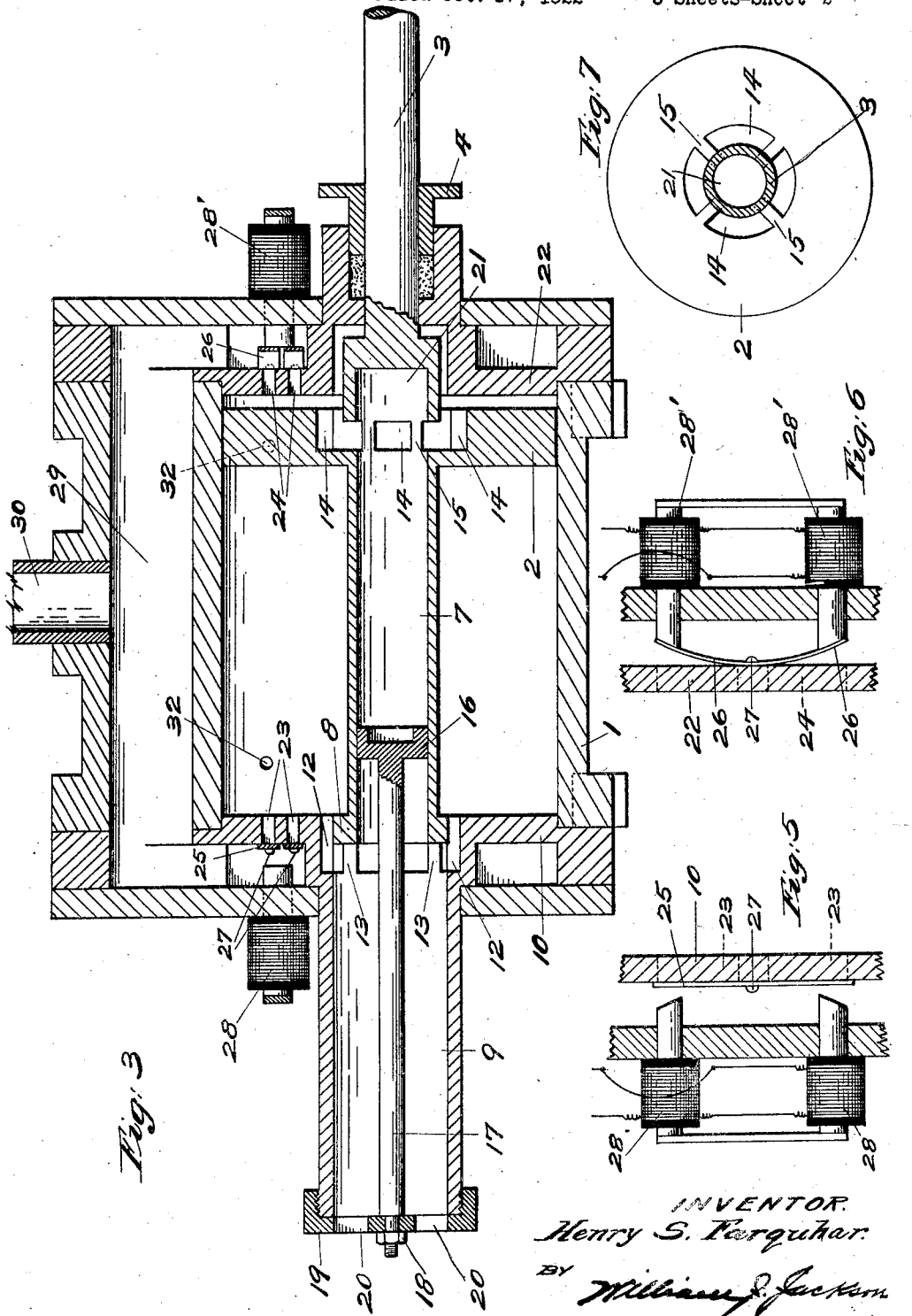

Feb. 24, 1925.
H. S. FARQUHAR
VALVE MECHANISM
Filed Oct. 17, 1922
1,527,678
5 Sheets-Sheet 3
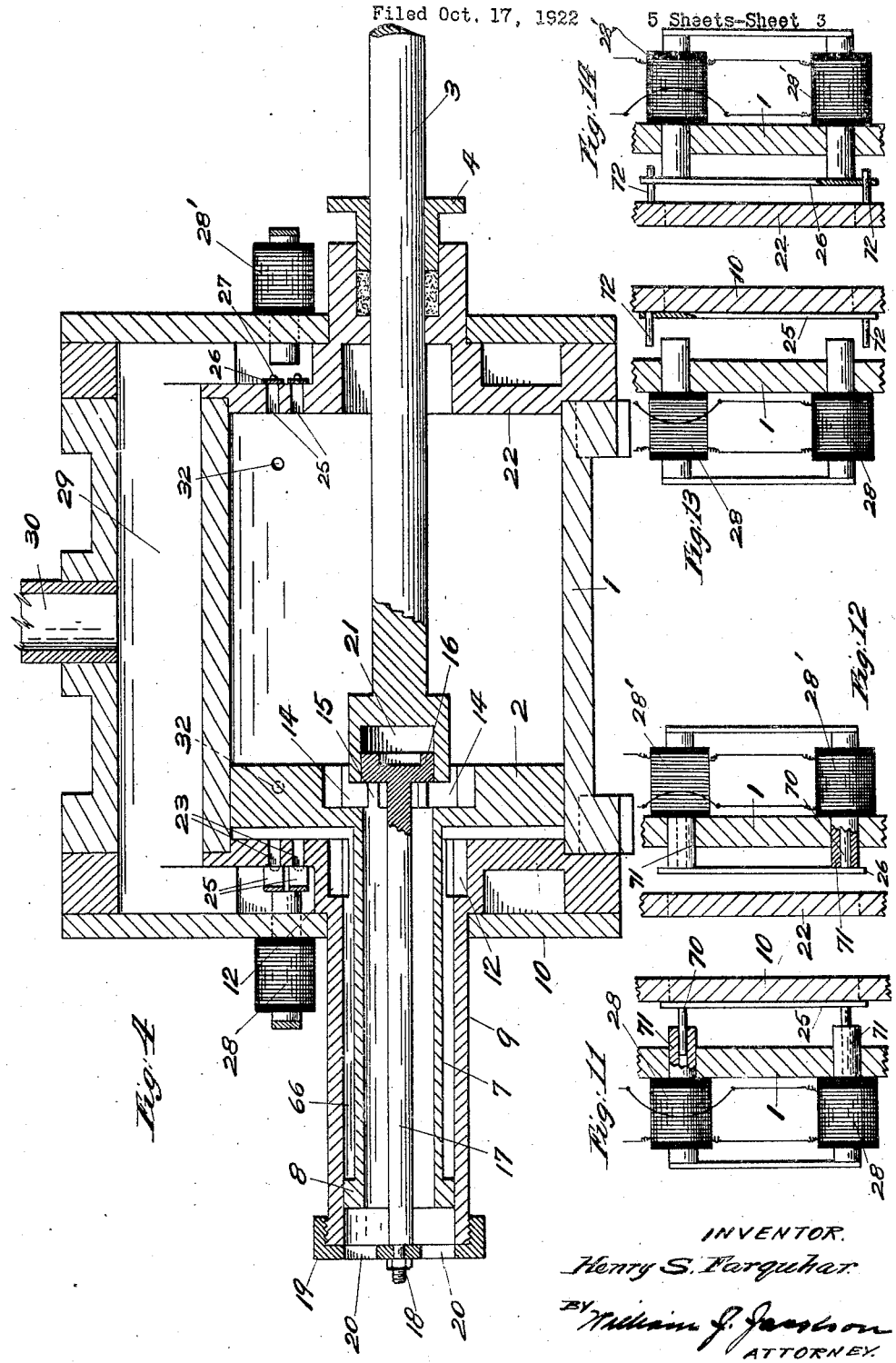
INVENTOR.
Henry S. Farquhar
BY William J. Jacobson
ATTORNEY.

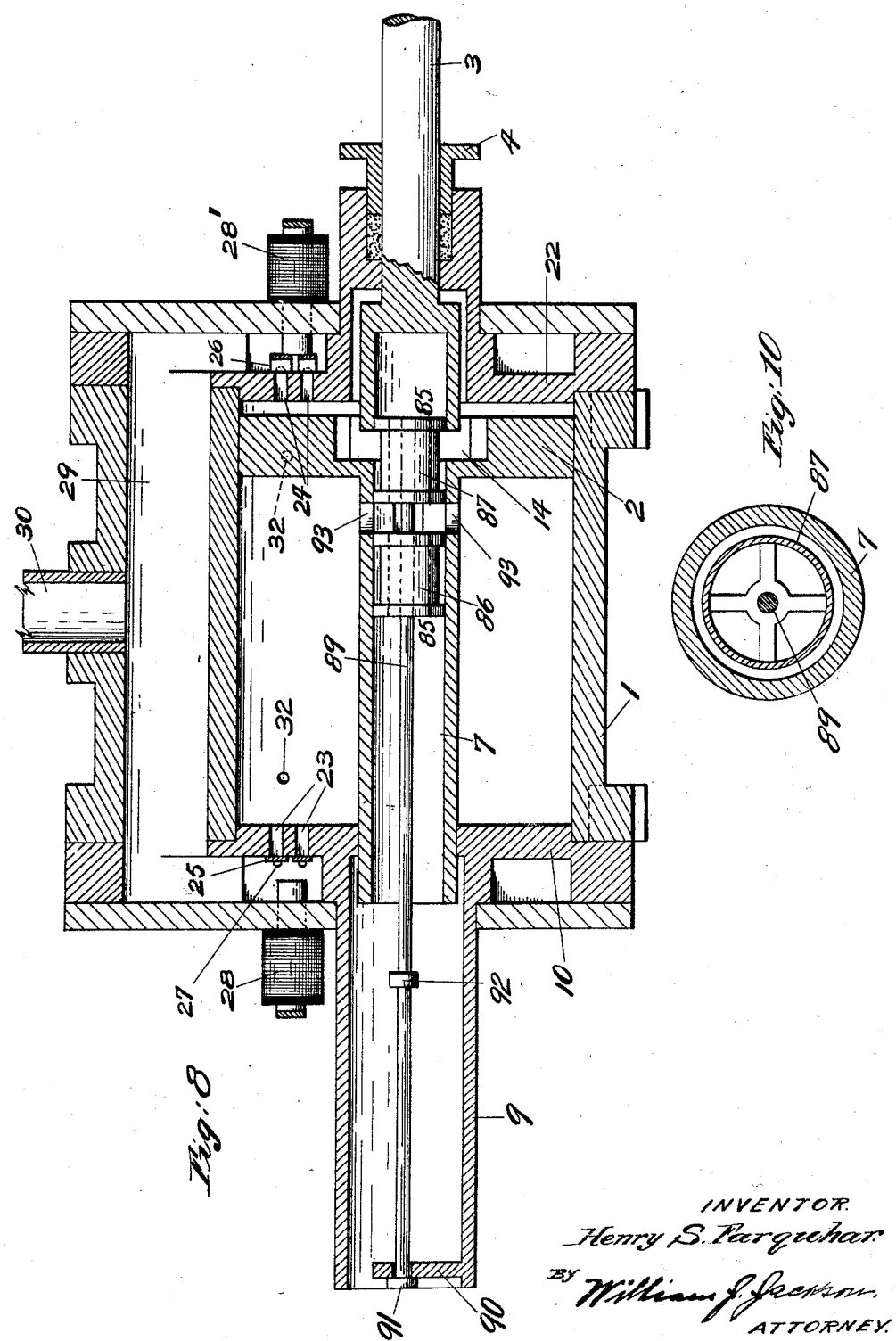

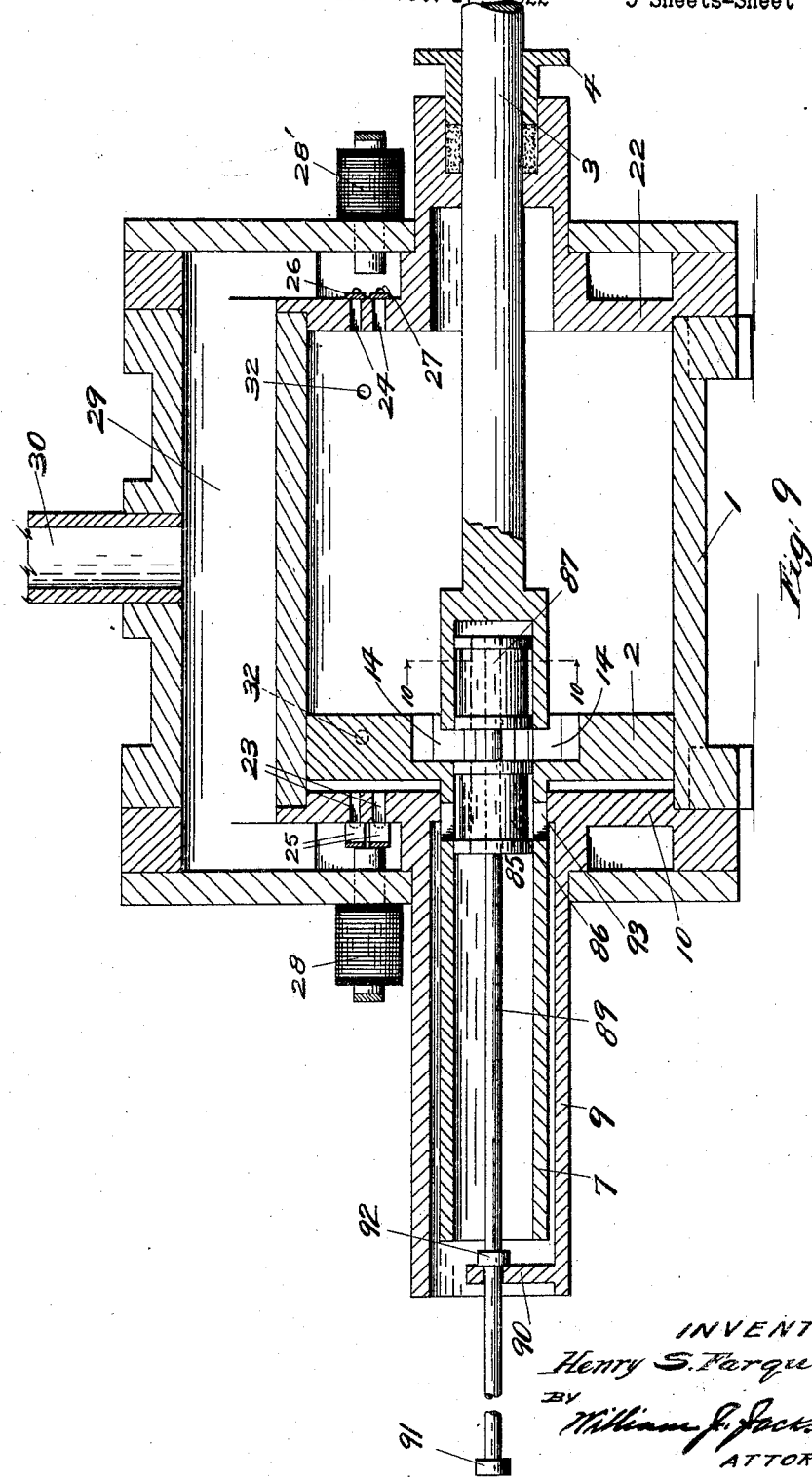

Patented Feb. 24, 1925.

1,527,678

UNITED STATES PATENT OFFICE.

HENRY S. FARQUHAR, OF WAYNE, PENNSYLVANIA.

VALVE MECHANISM.

Application filed October 17, 1922. Serial No. 595,153.

*To all whom it may concern:*

Be it known that I, HENRY S. FARQUHAR, a citizen of the United States, and a resident of Wayne, in the county of Delaware and State of Pennsylvania, have invented certain new and useful Improvements in Valve Mechanism, of which the following is a specification.

This invention, generally stated, relates to elastic-fluid pressure engines of the reciprocating or oscillating piston type and has more especial relation to a novel form of admission valve as well as exhaust valve for the cylinder thereof.

The primary object of the present invention may be said to be the provision of an admission valve for the cylinder of an engine of the character designated which is arranged to be opened by elastic-fluid pressure within the cylinder from one direction and is arranged to be positively held in such open position for a predetermined period and when released to be closed by pressure of elastic-fluid from without the cylinder and from another direction. A secondary object resides in the provision of a general arrangement, combination and connection of parts for attaining the results sought by said primary object. Other and further objects not at this time particularly set forth as well as the various advantages obtainable through the present invention will be apparent from the description following.

The invention consists of the improvements hereinafter described and finally claimed.

The nature, characteristic features and scope of the invention will be more fully understood from the following description taken in connection with the accompanying drawings forming part hereof and in which:

Fig. 1, is a view in plan showing more or less diagrammatically the cylinder of a double acting, reciprocating elastic-fluid pressure engine embodying features of the invention and parts for holding or locking the admission valves in open position.

Fig. 2, is a view in cross section taken upon the line 2—2 of Fig. 1.

Fig. 3, is a view in longitudinal section, drawn to an enlarged scale, of the cylinder shown in foregoing figures, and illustrating the operative arrangement of admission valves and exhaust valves in one position of the piston.

Fig. 4, is a similar view illustrating the operative arrangement of admission valves and exhaust valves with the piston in opposite or reverse position.

Fig. 5, is a fragmentary view in plan, principally sectioned, illustrating the closed position of admission valve as shown at the left hand side of Fig. 3.

Fig. 6, is a similar view illustrating the open position of admission valve as shown at the right hand side of Fig. 3.

Fig. 7, is an end view, partly sectioned, of the piston shown in Figs. 3 and 4.

Fig. 8, is a view in longitudinal section of a cylinder embodying modified features of the invention wherein an exhaust valve for prolonging duration of exhaust is illustrated.

Fig. 9, is a similar view illustrating the position of operative parts when the piston shown in Fig. 8, has moved to the left hand end of the cylinder.

Fig. 10, is a view in cross-section taken upon the line 10—10 of Fig. 9.

Figs. 11 and 12, are fragmentary views in plan, principally sectioned, illustrating the relative, operative position of an admission valve embodying a modified form of construction, and Figs. 13 and 14, are similar views illustrating a further modified form of admission valve.

For the purpose of illustrating my invention I have shown in the accompanying drawings several forms thereof which are at present preferred by me, although it is to be understood that the various instrumentalities of which my invention consists can be variously arranged and organized and that my invention is not limited to the precise arrangement and organization of the instrumentalities as herein shown and described.

In the drawings 1 designates the cylinder of an elastic-fluid pressure engine, as a steam engine. The piston is designated 2, the piston-rod 3 and the stuffing box through which the piston-rod reciprocates is designated 4. The piston-rod is coupled to the crank 5 of the engine by means of a connecting-rod 6. The piston has extended longitudinally therefrom, in opposed relation to piston-rod 3, a cylindrical tube 7 which terminates in a valve-head 8. This valve-head, which is a sliding valve-head, is cylindrical and is of larger diameter than is piston-rod 3 to coincide with the bore of a tube 9 fixed to and extended from head 10 of the cylinder. This head 10 is provided with an annular series of recesses 12 spaced apart by by means of radially disposed ribs 13. The recessed parts form an exhaust port and the ribs form a bearing surface for the valve-head 8. The piston 2 is also provided with an annular series of recesses 14 spaced apart by means of ribs 15. The recesses form an exhaust port and the ribs provide a bearing surface for the fixed valve-head 16. This fixed valve-head is carried by a rod 17 clamped as at 18 to a cap 19 secured to the free end of tube 9. Vents or openings 20 are provided in the cap 19. The fixed valve-head 16 is arranged within the tube 7 and that portion of the piston-rod 3 immediately forward of piston 2 is recessed as at 21 to accommodate said fixed valve-head in the rearward movement of the piston so that said valve-head may pass exhaust port formed by recesses 14. The heads 10 and 22 of the cylinder are each provided with elastic-fluid admission ports designated 23 and 24 respectively. These ports are controlled by valves 25 and 26. These valves are adapted to be opened by pressure from within the cylinder and maintained in open position for a predetermined period by suitable locking devices. For illustrative purposes I have selected electro-magnets and the following description will be restricted thereto, although obviously mechanical lock-locking devices may be utilized in lieu of electrical locking devices. The valves 23—24 may be of thin, elongated strips of magnetizable material and as shown in Figs. 2, 3, 4, 5 and 6 are centrally secured, as by screws 27, to the heads 10—22. As the piston 2 moves in one direction pressure of elastic-fluid within the cylinder causes one admission valve to open whereupon adjacent electro-magnet 28 or 28′ functions to hold open said valve as clearly shown in Fig. 6, said valve being flexed during this period. The mode of operation of the various valves hereinbefore mentioned will appear in detail as the specification progresses. Elastic fluid is admitted to the elastic fluid chest 29 of cylinder 1 by means of valved connection 30. Elastic fluid may be admitted direct to cylinder 1 by means of a valved connection 31, leading from connection 30, and which is provided with branch pipes 32, leading to opposite ends of the cylinder.

Having now described the structural characteristics of the valve mechanism embodying features of the invention a description will now be given of the electrical arrangement for controlling the functioning of the electro-magnets 28—28′ references being had to Fig. 1 of the drawings. Fixed upon and rotatable with the shaft 37 of the engine but insulated therefrom is a cylindrical switch 38, constructed of conducting material 39 and non-conducting material 40. These materials are arranged in stepped relation as shown by the lines 41 and 42 to form different lengths of contact in the revolving of the switch with respect to the several brushes 43, 44, 45, 46, 47, 48, 49, 50, 51, 52, 53, 54. Brush 55 is always in contact with the conducting material 39. Each of the brushes 43 to 54 inclusive are electrically connected with a contact piece of manual switch 56. This switch, which is conventionally shown, is provided with a pair of contact bars 57 and 58, insulated from each other, but fixed in relative location to each other, and which may be turned by the handle 59 around the pin 60 to bring any of the brushes 43 to 48 in electrical connection with contact piece 61 of the switch 56 and any of the brushes 49 to 54 in electrical connection with contact piece 62. Brush 55 is electrically connected to battery 63 or other electrical source through the double-pole, single-throw switch 64 the battery being electrically connected through the said switch 64 with the electro-magnets 28—28′. The return conductor from electro-magnet 28 leads to contact piece 62 and the return conductor from electro-magnet 28′ leads to contact piece 61, thus completing an electrical circuit with the revolving switch 38. By closing the double-pole, single throw-switch 65 and the double-pole, single throw switch 64, circuit is made direct through both electro-magnets 28 and 28′ without the interposition of the revolving switch 38 or the switch 56. The brushes 43 to 45 and 49 to 51 function in the rotation of shaft 37 in one direction and the brushes 46 to 48 and 52 to 54 function in the rotation of shaft 37 in an opposite direction

The mode of operation of the above described valve mechanism and electrical connections therefor may be described as follows: Assuming that an engine is within a reasonable distance of dead center, which must be the condition to start any single cylinder engine, the double-pole single-throw switches 64 and 65 are closed thus energizing both electro-magnets 28 and 28′. Valve 32′ of elastic fluid connection 31 is then opened admitting elastic fluid to the interior of cylinder 1 upon both sides of the piston 2 through connections 32. Pressure within the cylinder 1 thus causes the opening of admission valves 25 and 26. Thus opened they are flexed to contact with the electro-magnets 28 and 28′ respectively. Switch 56 is then placed at whatever point of cut off it is desired to operate the engine. As illustrated it is in contact with brushes 44 and 50. The double-pole, single-throw switch 65 is now opened thus breaking electrical contact with one of the electro-magnets. Valve 32' is now closed and elastic fluid admitted through pipe 30 to elastic fluid chest 29. With the admission of elastic fluid one of the admission valves is held open by an energized electro-magnet and the other valve promptly closes because elastic fluid flowing past it causes a difference in pressure; that behind a valve being greater than that in front of it. Now let it be assumed that the engine shaft 37 is revolving in a clockwise direction and that the piston 2 has assumed the position shown in Fig. 3. Admission valve 25 is closed; admission valve 26 is open; exhaust port 12 is open and exhaust port 14 is closed. As piston 2 moves toward the left in said figure to assume the position shown in Fig. 4, exhaust port 12 is closed by means of valve-head 8 and upon exhaust port 12 being closed, compression of confined elastic fluid commences. When pressure in the clearance pocket 66, formed between the cylindrical tube 7 and the extension tube 9 (see Fig. 4), becomes greater than the elastic-fluid pressure in the elastic fluid chest 29 then admission valve 25 will open. Upon piston 2 reaching a point near the end of its stroke, electro-magnet 28 is energized and locks or holds open admission valve 25 during a portion of the return stroke of the piston. During the above movement of valves admission valve 26 has been locked or held open by the electro-magnet 28' until its electrical circuit has become broken by the brush 44 passing from conducting material 39 to non-conducting material 40 of the revolving switch 38, thus de-energizing electro-magnet 28' and causing it to release admission valve 26; the flow of elastic fluid past admission valve 26 causing it to close. When piston 2 has traveled to a point near that shown in Fig. 4, exhaust port 14 is opened by passing beyond the valve head 16. The operation upon reverse stroke of the piston is obvious. The interior of the cylindrical tube 7 also serves as a clearance pocket for the compressed elastic fluid. It will be noted that clearance pocket 66 and the clearance pocket as formed in tube 7 both discharge their contents back into the cylinder to enhance the work of the expanding elastic fluid. In the case of an engine "drifting" as when a locomotive is running down-grade with elastic fluid supply cut off, the closing of double-pole, single-throw switch 65 will cause both admission valves 25 and 26 to be held open. Thus the contents of one side of cylinder 1 may pass to the opposite side, the elastic fluid chest 29 serving as a by-pass. In this connection it is to be particularly noted that neither magnetic attraction or repulsion is depended upon to open or close any of the valves found in the above described arrangement of parts. The admission valves 25 and 26 are opened by the pressure of the compressed elastic fluid within the cylinder, as this pressure is greater than the pressure in the chest 29, and they are locked in open position for a period and closed by the flow of elastic fluid past them after release. Thus there is created a differential of pressure; that in the chest 29 being greater than that of the expanding elastic fluid in cylinder 1.

In the modification shown in Figs. 8, 9 and 10, I have shown an exhaust valve 85 consisting of two heads 86 and 87 which are hollow as indicated in Fig. 10 and which are joined together by a rod 89. This rod extends rearwardly through an aperture in a fixed guide post 90, said rod 89 having attached thereto collars 91 and 92 spaced to limit the movement of the rod 89 and the travel of the exhaust valve. 93 designates an exhaust port for cylinder 1 when the piston 2 is traveling towards the left in Fig. 8. When the collar 92 contacts with the guide post 90 then exhaust valve 85 becomes stationary but the cylindrical tube 7 continues to move and closes exhaust port 93. Port 14 functions as an exhaust for cylinder 1 when piston 2 is traveling towards the right in Fig. 9. When collar 91 contacts with the guide post 90 then exhaust valve 85 becomes stationary but the cylindrical tube 7 continues to move and closes the exhaust port 14.

In Figs. 11 and 12, there is disclosed a modified form of admission valve. Instead of securing the strips 25—26 to the heads 10—22 as disclosed in the foregoing figures of the drawings these strips are bodily movable with respect to said heads. Each strip 25—26 has fixed thereto a pair of horizontally disposed rods 70 adapted for longitudinal movement through the hollow cores 71 of electro-magnets 28—28'.

In Figs. 13 and 14 a further modified form of admission valve is shown. The heads 10—22 have projected horizontally therefrom rods 72 upon which the strips 25—26 are movably mounted said strips being apertured for rod accommodation.

While the above described forms of admission valves and exhaust valves form a good working combination it is to be understood that the admission valves herein disclosed may be used in conjunction with other types of exhaust valves and that the present form of exhaust valves may be employed in connection with other types of admission valves. It is also to be noted that while I have illustrated only three different points of cut off on the revolving switch 38, the number may be varied as found desirable.

It will now be apparent that I have devised a novel and useful construction which embodies the features of advantage enumerated as desirable in the statement of the invention and the above description and while I have in the present instance shown and described the preferred embodiments thereof, it is to be understood that the same are susceptible of modification in various particulars without departing from the spirit or scope of the invention or sacrificing any of its advantages.

What I claim is:

1. In apparatus of the character stated an engine cylinder having an elastic fluid discharge conduit at one end thereof, a piston operable through said cylinder, a hollow extension projected from said piston having a valve head at its free end said extension being movable through said conduit, an exhaust port forming communication between the cylinder interior and said conduit and controlled by said valve head, an exhaust port forming communication between the cylinder interior and said hollow extension and a fixed valve head arranged within said hollow extension for controlling the last mentioned exhaust in the movement of said piston with respect to said fixed valve head.

2. In apparatus of the character stated an engine cylinder having an elastic fluid discharge conduit at one end thereof, a piston operable through said cylinder, an extension of smaller diameter than said conduit projected from said piston for travel through said conduit, a valve head carried by the free end of said extension, an exhaust port forming communication between said cylinder and said conduit functioning to provide a clearance pocket for the confinement of compressed elastic fluid between said conduit and extension.

3. A construction as described in claim 2, characterized by means for evacuating said pocket of confined elastic fluid during the forward stroke of the piston.

In testimony whereof, I have hereunto signed my name.

HENRY S. FARQUHAR.